US012736684B2

(12) United States Patent
Gevargiz et al.

(10) Patent No.: US 12,736,684 B2
(45) Date of Patent: Sep. 15, 2026

(54) BINARY OFFSET CARRIER (BOC) SIDEBAND PROCESSING

(71) Applicant: The Aerospace Corporation, El Segundo, CA (US)

(72) Inventors: John M. Gevargiz, Manhattan Beach, CA (US); Che-i Lien, Hawthorne, CA (US); Richard T. Sharpe, Torrance, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 297 days.

(21) Appl. No.: 18/428,671

(22) Filed: Jan. 31, 2024

(65) Prior Publication Data

US 2025/0244484 A1 Jul. 31, 2025

(51) Int. Cl.
*G01S 19/24* (2010.01)
*G01S 19/25* (2010.01)

(52) U.S. Cl.
CPC ............ *G01S 19/243* (2013.01); *G01S 19/25* (2013.01)

(58) Field of Classification Search
CPC ........ G01S 19/243; G01S 19/25; G01S 19/30; G01S 19/37; H04B 1/707; H04B 1/7075
USPC .................................................... 342/357.62
See application file for complete search history.

(56) References Cited

U.S. PATENT DOCUMENTS

2010/0142593 A1* 6/2010 Schmid .................. G01S 19/21 375/147
2010/0164798 A1* 7/2010 Yudanov ............... G01S 19/235 342/357.62
2011/0279318 A1* 11/2011 Lennen .................. G01S 19/33 342/357.77
2021/0006281 A1* 1/2021 Gerten .................... G01S 19/02
2021/0242899 A1* 8/2021 Macleod .............. H04B 1/7085
2023/0350081 A1* 11/2023 Wu .......................... G01S 5/01

* cited by examiner

*Primary Examiner* — Brady W Frazier
(74) *Attorney, Agent, or Firm* — LeonardPatel PC

(57) ABSTRACT

A global positioning system (GPS) receiver configured to perform binary offset carrier (BOC) sideband processing. The GPS receiver includes an analog RF subsystem and a digital subsystem and software module. The analog radio frequency (RF) subsystem is configured to acquire a BOC signal from a GPS satellite and converts the BOC signal to a based-banded signal. The digital subsystem and software module is configured to generate another signal and a local replica signal of the other signal to improve code tracking loop performance of the GPS receiver.

31 Claims, 9 Drawing Sheets

Fig. 1

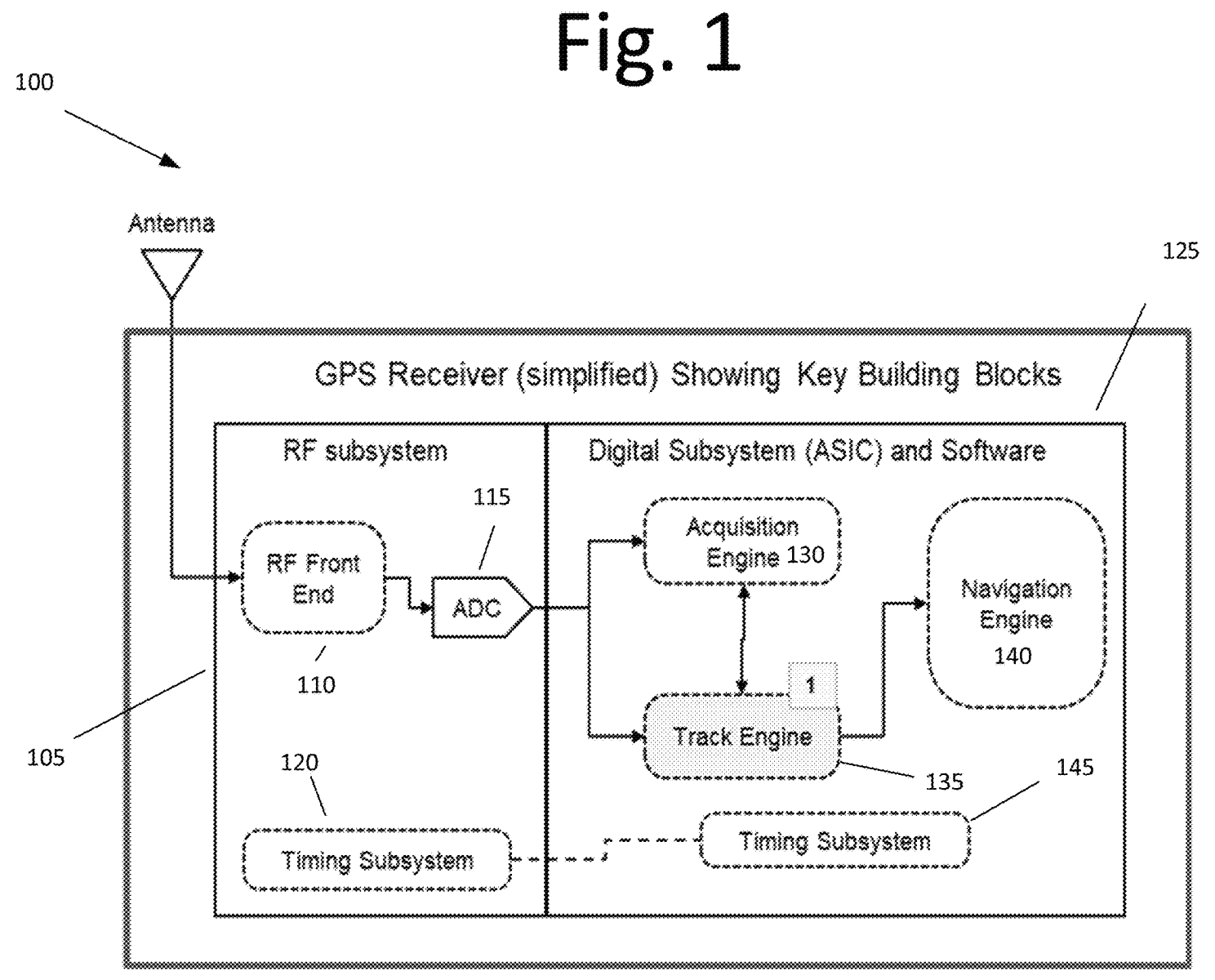

GPS Receiver (simplified) Showing Key Building Blocks

RF subsystem

RF Front End

ADC

Timing Subsystem

Digital Subsystem (ASIC) and Software

Acquisition Engine 130

Track Engine

1

Navigation Engine 140

Timing Subsystem

Antenna

Figure 2:
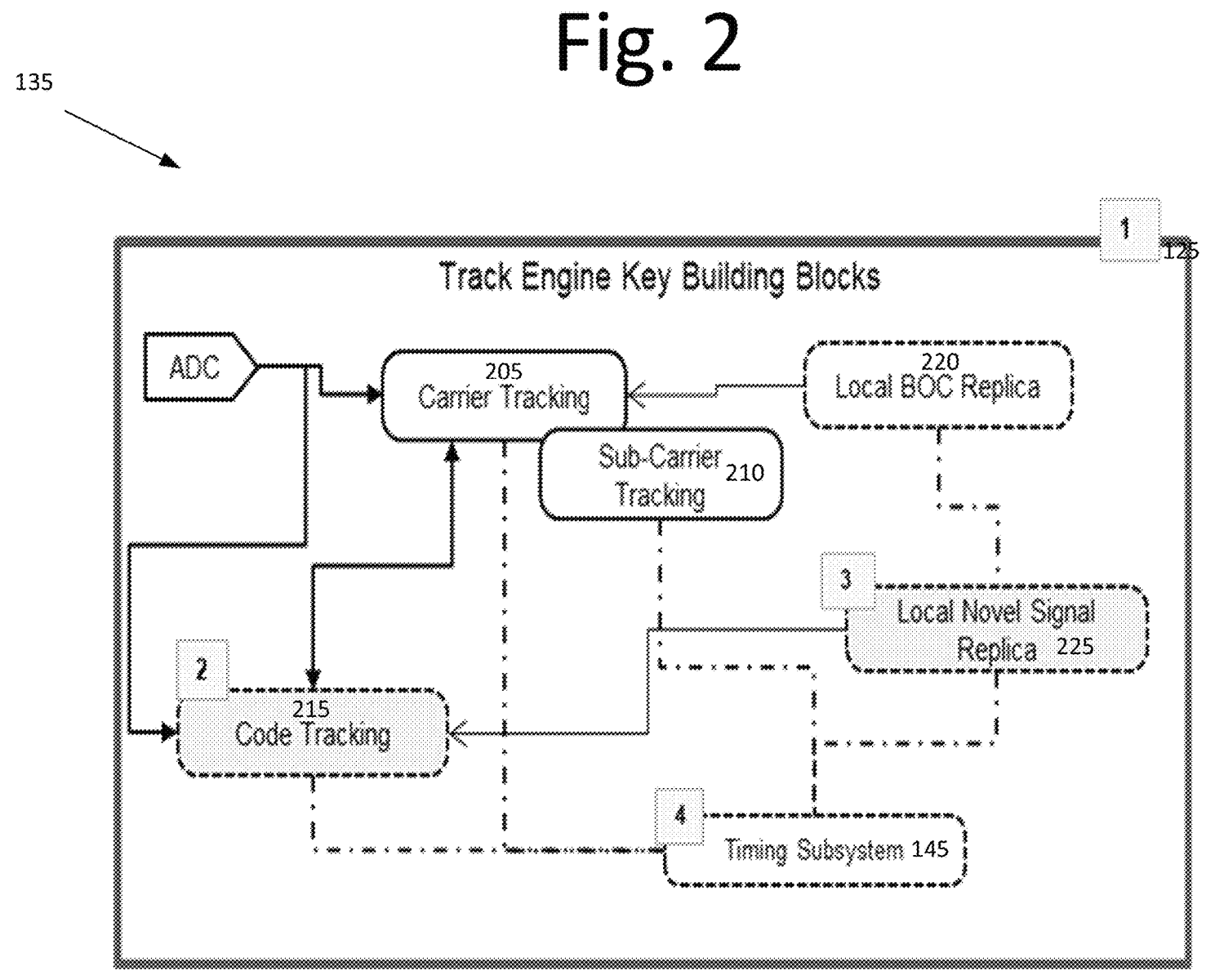

Track Engine Key Building Blocks

220
Local BOC Replica

3

Local Novel Signal Replica 225

Sub-Carrier Tracking 210

205
Carrier Tracking

Timing Subsystem 145

4

ADC

2

215
Code Tracking

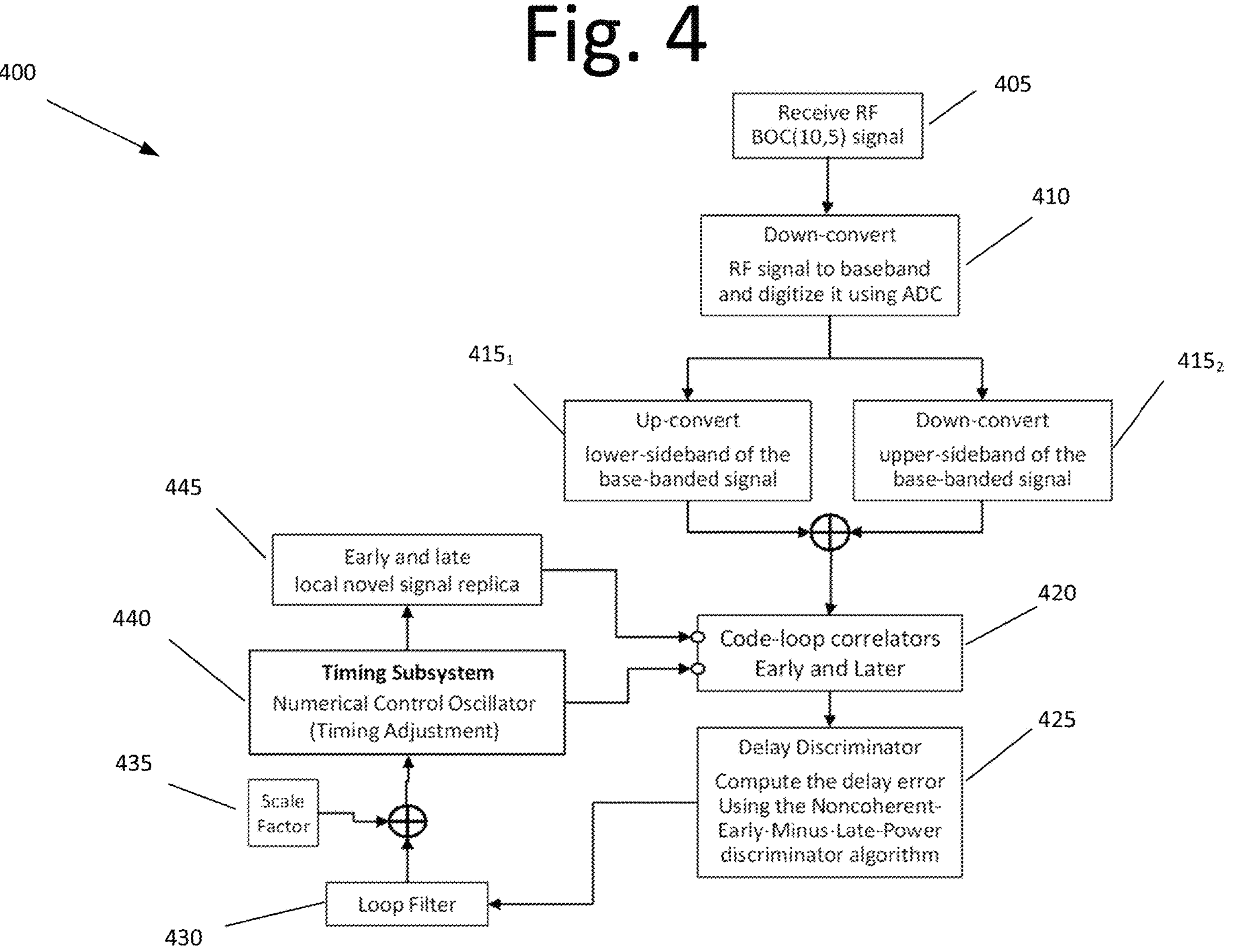

Fig. 4
400
405
Receive RF BOC(10,5) signal
410
Down-convert RF signal to baseband and digitize it using ADC
415₁
Up-convert lower-sideband of the base-banded signal
415₂
Down-convert upper-sideband of the base-banded signal
445
Early and late local novel signal replica
420
Code-loop correlators Early and Later
440
Timing Subsystem Numerical Control Oscillator (Timing Adjustment)
425
Delay Discriminator Compute the delay error Using the Noncoherent-Early-Minus-Late-Power discriminator algorithm
435
Scale Factor
430
Loop Filter

Figure 5:
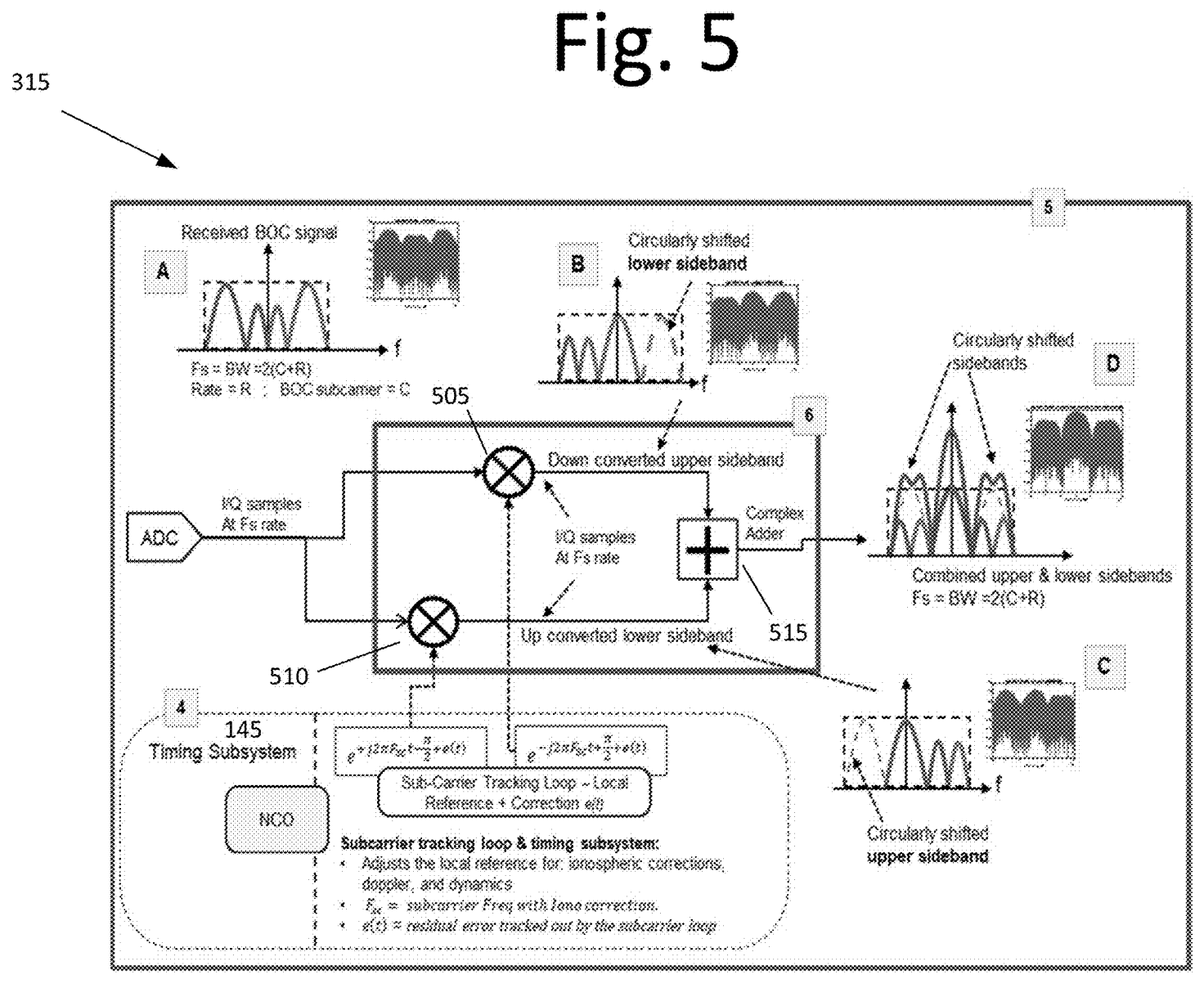

A
Received BOC signal
Fs = BW =2(C+R)
Rate = R ; BOC subcarrier = C
ADC
IQ samples
At Fs rate
B
Circularly shifted
lower sideband
Down converted upper sideband
IQ samples
At Fs rate
Up converted lower sideband
505
510
Complex
Adder
515
6
5
D
Circularly shifted
sidebands
Combined upper & lower sidebands
Fs = BW =2(C+R)
C
Circularly shifted
upper sideband
4
145
Timing Subsystem
NCO
Sub-Carrier Tracking Loop – Local
Reference + Correction e(t)
Subcarrier tracking loop & timing subsystem:
Adjusts the local reference for: ionospheric corrections, doppler, and dynamics
$f_{sc}$ = subcarrier Freq with iono correction
e(t) = residual error tracked out by the subcarrier loop 600(a)
600(b)
605
610
Normalized Correlation Curves
Normalized S Curves
Dual Sideband
BPSK
BOC(10,5)
Input Error (Chips)

700

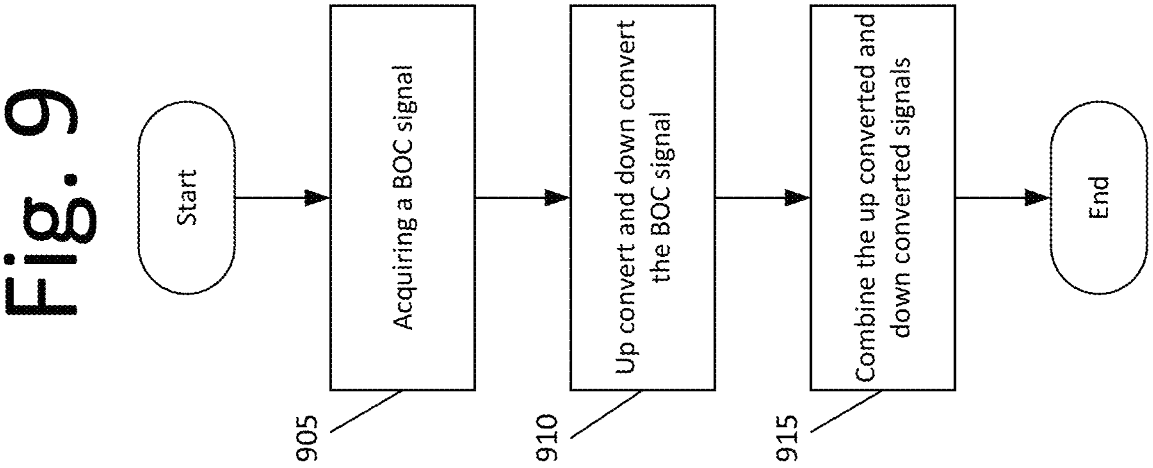
Fig. 9
Start
905
Acquiring a BOC signal
910
Up convert and down convert the BOC signal
915
Combine the up converted and down converted signals
End
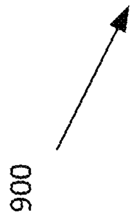
900

BINARY OFFSET CARRIER (BOC) SIDEBAND PROCESSING

FIELD

The present invention relates to global positioning system (GPS) applications, and more particularly, to a Binary Offset Carrier (BOC) sideband signal processing technique to improve GPS receiver's code tracking loop performances in the presence of broadband and matched spectrum jammers.

BACKGROUND

Operating GPS receivers in the presence of high levels of interferences can result in performance degradation and, in the worst-case, denial of service. Industry has been investigating signal processing techniques, modulation designs, and technologies to improve GPS receiver performance against jamming. Introduction of BOC modulation for GPS signal was a step forward for extending the operation capabilities and improving signal acquisition and tracking performances of the receiver in the presence of jamming interferers. This invention specifically improves the State 3 or code tracking performance of the GPS BOC receivers by about 4-5 dB (300%) relative to standard GPS receiver state 3 track engine performance.

Accordingly, an improved BOC sideband signal processing technique may be beneficial.

SUMMARY

Certain embodiments of the present invention may provide solutions to the problems and needs in the art that have not yet been fully identified, appreciated, or solved by current GPS technologies. For example, some embodiments of the present invention pertain to a GPS receiver that uses a BOC sideband signal processing technique to improve GPS receiver's code tracking loop performances.

In an embodiment, a GPS receiver configured to perform BOC sideband processing includes an analog radio frequency (RF) subsystem and a digital subsystem and software module. The RF subsystem is configured to acquire a BOC signal from a GPS satellite and converts the BOC signal to a based-banded signal. The digital subsystem and software module is configured to up converts a lower-sideband of the base-banded signal and down converts an upper-sideband of the base-banded signal, and combine the up converted lower-sideband of the base-banded signal and the down converted upper-sideband of the base-banded signal to generate a signal.

In another embodiment, a GPS receiver configured to perform BOC sideband processing. The GPS receiver includes an analog RF subsystem and a digital subsystem and software module. The analog RF subsystem is configured to acquire a BOC signal from a GPS satellite and converts the BOC signal to a based-banded signal. The digital subsystem and software module is configured to generate another signal and a local replica signal of the other signal to improve code tracking loop performance of the GPS receiver.

In yet another embodiment, a method for performing binary offset carrier (BOC) sideband processing includes acquiring, by a RF subsystem, a BOC signal from a GPS satellite and converting the BOC signal to a based-banded signal. The method also includes up converting, by a digital subsystem and software module, a lower-sideband of the base-banded signal and down converts an upper-sideband of the base-banded signal. The method further includes combining, by the digital subsystem and software module, the up converted lower-sideband of the base-banded signal and the down converted upper-sideband of the base-banded signal to generate a signal.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a diagram illustrating a GPS receiver with an analog RF subsystem and a digital subsystem, according to an embodiment of the present invention.

FIG. 2 is a diagram illustrating a track engine of GPS receiver, according to an embodiment of the present invention.

FIG. 4 is a flow diagram illustrating a method for performing BOC sideband processing, according to an embodiment of the present invention.

FIG. 5 is a diagram illustrating a BOC sideband processor for side-band processing, according to an embodiment of the present invention.

FIG. 9 is a flow diagram illustrating a method for performing binary offset carrier (BOC) sideband processing, according to an embodiment of the present invention.

DETAILED DESCRIPTION OF THE EMBODIMENTS

Figure 3:
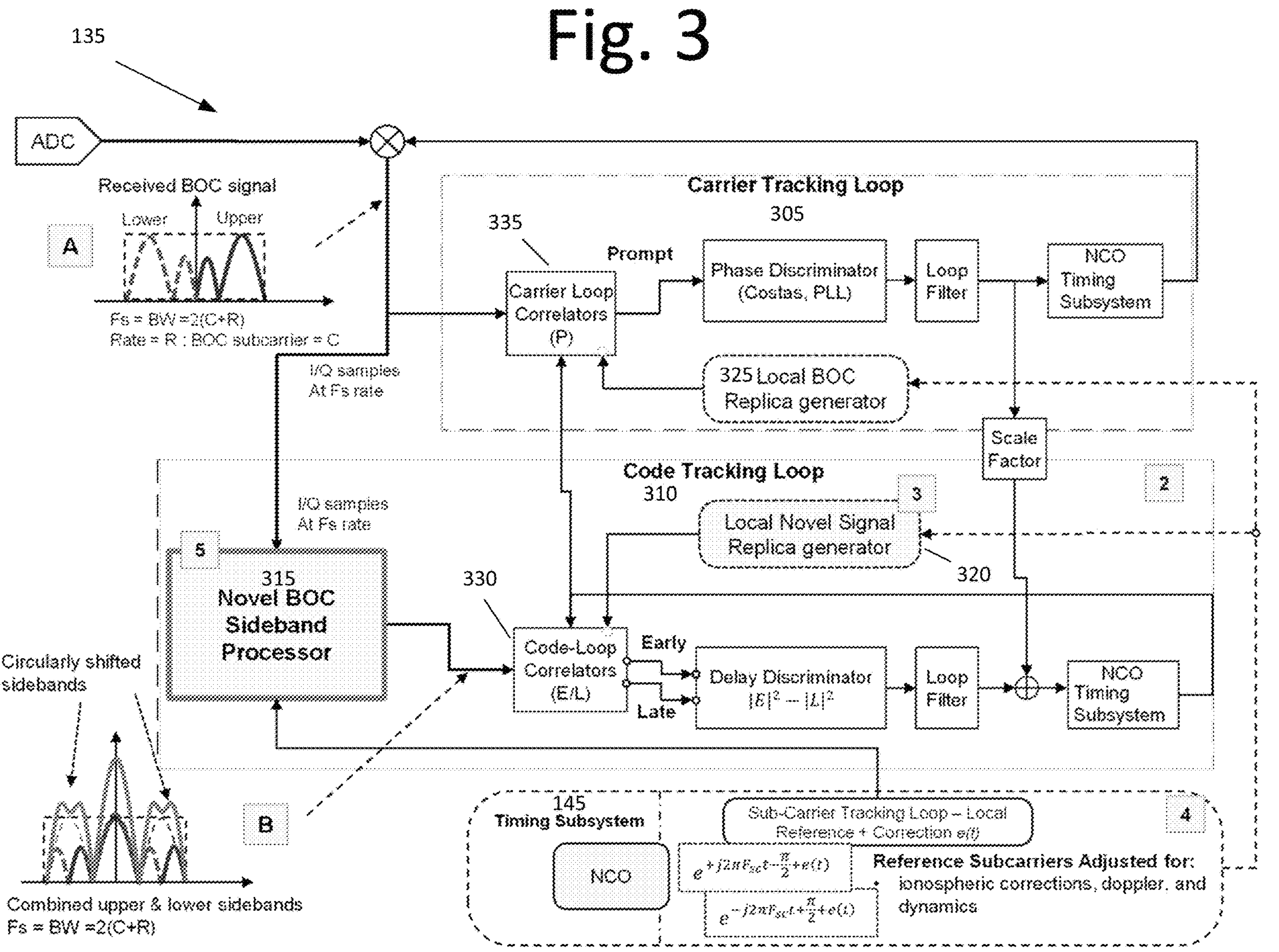
FIG. 3 is a block diagram illustrating a track engine of GPS receiver, according to an embodiment of the present invention.

Some embodiments generally pertain to a BOC sideband signal processing technique, leveraging properties of the BOC modulation to significantly improve GPS receiver's code tracking loop performances in the presence of broadband and matched spectrum jammers.

FIG. 1 is a diagram illustrating a GPS receiver 100 with an analog radio frequency (RF) subsystem 105 and a digital subsystem 125, according to an embodiment of the present invention. The digital subsystem 110 includes an acquisition engine 130 and track engine 135, as well as navigation engine 140. A more detailed description of track engine 135 of FIG. 2 below is described below.

The operation of GPS receiver 100 begins by first acquiring signals from the GPS satellite. In some embodiments, the acquired signals are BOC signals. Once the BOC signals are acquired and the frequency and timing error are within the specification, track engine 135 takes over to bring in the code and carrier phase error of the BOC signal to within a specification to meet the navigation accuracy requirements. Specification, for purposes of explanation, may be defined as a code loop 1 sigma delay error in fractions of a chip (e.g., threshold 0.0208).

RF subsystem 105 of GPS receiver 100, depicted in FIG. 1, includes RF front end 110, Analog to Digital Converter (ADC) 115, and timing system 120. Some embodiments of the present invention are independent from RF subsystem 105 and may work with any RF subsystem architecture. Furthermore, some embodiments are an upgrade and addition to track engine 135, which is part of digital subsystem 125 implemented in the Application-Specific Integrated Circuit (ASIC) or software.

Typically, RF front end 110 provides an interface to an antenna, and down converts the received RF signal to an intermediate frequency (IF), which is then digitized by ADC 115. A typical timing subsystem 120, 145 includes local oscillator (LO) and all at the associated hardware for generating reference clocks. These reference clocks are then used for the carrier, code, and sub-carrier track loops. Timing subsystem 120, 145, in some embodiments, adjusts and corrects the local reference clocks for ionospheric errors, doppler and dynamics.

FIG. 2 is a diagram illustrating track engine 135 of GPS receiver 100, according to an embodiment of the present invention. The track engine's 135 key building blocks include, but are not limited to, carrier tracking 205, subcarrier tracking 210 and code tracking loops 215. Code tracking loops 215 use local replicas of the GPS BOC code. Timing subsystem 145 provides the local reference clocks for code tracking loops 215. It should be appreciated that some embodiments are independent of the designs of carrier and subcarrier loop, which can utilize any architecture that may be envisioned by a person of ordinary skill in the art.

The principal operations of code tracking loop 215 and carrier tracking 205 are based on correlating the received BOC signal with the local replicas. See local BOC replica 220. In some embodiments, track engine 135 includes two local reference code generators-a local BOC code generator 220 configured to generate for a local BOC replica for carrier loop, and a local signal code generator 225 configured to generate a local signal replica for code tracking loop 215. A more detailed description of code tracking loop 215 is described below in FIG. 3.

FIG. 3 is a block diagram illustrating a track engine 135 of GPS receiver 100, according to an embodiment of the present invention. In this embodiment, track engine 135 shows a design or configuration of the code loop 305 and carrier tracking loops 310. Although some components may be commonly used, the addition of a BOC Sideband Processor 315 and Signal Replica generator 320 are unique and nonobvious to the embodiments described herein.

TBOC Sideband Processor 315 and the Signal Replica generator 320 are independent digital signal processors that are implemented in software or hardware, and integrated with any track engine architecture that uses BOC modulation.

In these embodiments, FIG. 3 shows that the digitized and down converted received GPS BOC signal is simultaneously processed by carrier tracking loop 305 and code tracking loop 310. The carrier and code tracking loop architectures are standard tracking loop designs that are used for GPS receivers, with the exception of the BOC Sideband Processor 315, which is included as part of the code tracking loop 310. A more detailed description of BOC sideband process 315 is described in FIG. 5.

Also shown in FIG. 3 are building blocks of carrier tracking loop 305, and code tracking loop 310. In FIG. 3, local reference code generators (i.e., local signal replica generator 320 and local BOC replica generator 325) are configured to generate a local signal replica and a local BOC replica that is used by code loop correlators 330 and carrier loop correlators 335, respectively. The timing of the code tracking loop 310 and carrier tracking loop 305, as well as the local replicas are managed and controlled by timing subsystem 145. The local reference for code loop correlator 330 is key in these embodiment, while the local replica for carrier loop correlator 335 is the BOC signal.

FIG. 4 is a flow diagram illustrating a method 400 for performing BOC sideband processing, according to an embodiment of the present invention. The code tracking loop is embodied by the BOC sideband processing, showing the sideband band processors, early and late correlators, and delay discriminator. The other elements shown are the loop filter, timing subsystem and numerical control oscillators (NCO), and local replica of the GPS BOC code.

In some embodiments, method 400 begins at 405 with receiving an RF BOC (10, 5) signal by the RF front end of the RF subsystem. At 410, the ADC in the RF subsystem down converts the RF signal to baseband and digitizes the RF signal to produce a digitized signal. From there, at 4151 and 4152, the digital subsystem up converts the lower-sideband of the base-banded signal, and down converts the upper-sideband of the base-banded signal.

Upconverted and down-converted 4151 and 4152 sidebands are combined to generate the novel signal, which is followed by the early and late Code-loop correlators 420. See Reference D of FIG. 5, which shows a spectral characteristics showing the combined upper and lower sidebands.

The early and late correlators use local reference 445 of the novel signal. In some embodiments, early and late correlators is generated locally at the receiver signal processing chain using the exact same or similar process as described above, i.e., up-converting lower-sideband of the local BOC replica, and down converting the upper-sideband of the local BOC replica, and combining the up-converted lower-sideband and down converted upper-sideband to generate the local replica of novel signal 445.

The timing adjustment of local replica 445 are controlled by timing subsystem 440. The adjustment includes alignment of the lower and upper sidebands, updating the phase, as well as frequency. Timing subsystem 440 uses the error signal that is computed and adjusted by delay discriminator 425, loop filters 430, and scale factor 435, to make the timing adjustments.

Delay discriminator 425 may compute the delay error using the non-coherent early minus late power discriminator algorithm. The output from delay discriminator 425 is followed by the loop filter 430, and further adjusted by the scale factor 435. The design of delay discriminator 445, specification of loops filter 430, and scale factor 435 are a function of the operating dynamics and are described here as an example of an implementation of the GPS receiver using the embodiments of the present invention.

It should be appreciated that the two added functionalities to GPS receiver are the addition of the BOC sideband processor and local novel signal replica.

FIG. 5 is a diagram illustrating a BOC sideband processor 315 for side-band processing, according to an embodiment of the present invention. In this embodiment, BOC sideband processor 315 includes a down-converter 505 configured to down-convert an upper sideband of the BOC signal and an up-converter 510 configured to up-convert a lower sideband of the BOC signal to a common frequency. A complex adder 515 is configured to combine the down converted upper sideband and the up converted lower sideband by leveraging BOC signal attributes, sampling frequency, and circular shift property of the frequency conversion (up and down). The combined signal is composed of a main lobe and two sidelobes. The main lobe is the combined upper and lower side lobes of the down-converted and up-converted BOC signals, respectively, while the side lobes are the lower and upper sidebands of the down-converted and up-converted BOC, respectively.

The circular shift property is used in these embodiments, and is achieved by selecting sampling frequency as function BOC signal specification:

| | |
|---|---|
| BOC subcarrier frequency: | C |
| BOC Code rate: | R |
| Total Bandwidth: | BW = 2(R + C) |
| Sampling Frequency: | Fs = BW |

The up and down conversions of the BOC sidebands may use the local reference subcarrier frequency generated by timing subsystem 145. In some embodiments, subcarrier tracking loop adjusts the local reference for the ionospheric corrections, doppler and dynamics. The local references for the up conversion of the lower sideband and down conversion of the upper sideband, respectively, to baseband may be given by:

$$e^{+j2\pi F_{sc}t-\frac{\pi}{2}+e(t)} \quad \text{Equation (1)}$$

$$e^{-j2\pi F_{sc}t+\frac{\pi}{2}+e(t)} \quad \text{Equation (2)}$$

where $F_{sc}$ is the subcarrier frequency and e(t) is the residual error that is tracked out by the subcarrier tracking loop.

As shown in FIG. 5, at each point (see A, B, C, and D) of the sideband processing, a theoretical spectral plot is presented. The unprocessed spectral plot starting at the input of the BOC sideband processor 315 is shown at point A. The spectral plots after the up and down conversions are shown at points C and B, respectively, and the combined spectral plot is shown at point D. The spectral plot at point D shows the primary main lobes, as well as the secondary lobes. See, for example, dashed lines 605, 610 in FIG. 6.

Figure 6:
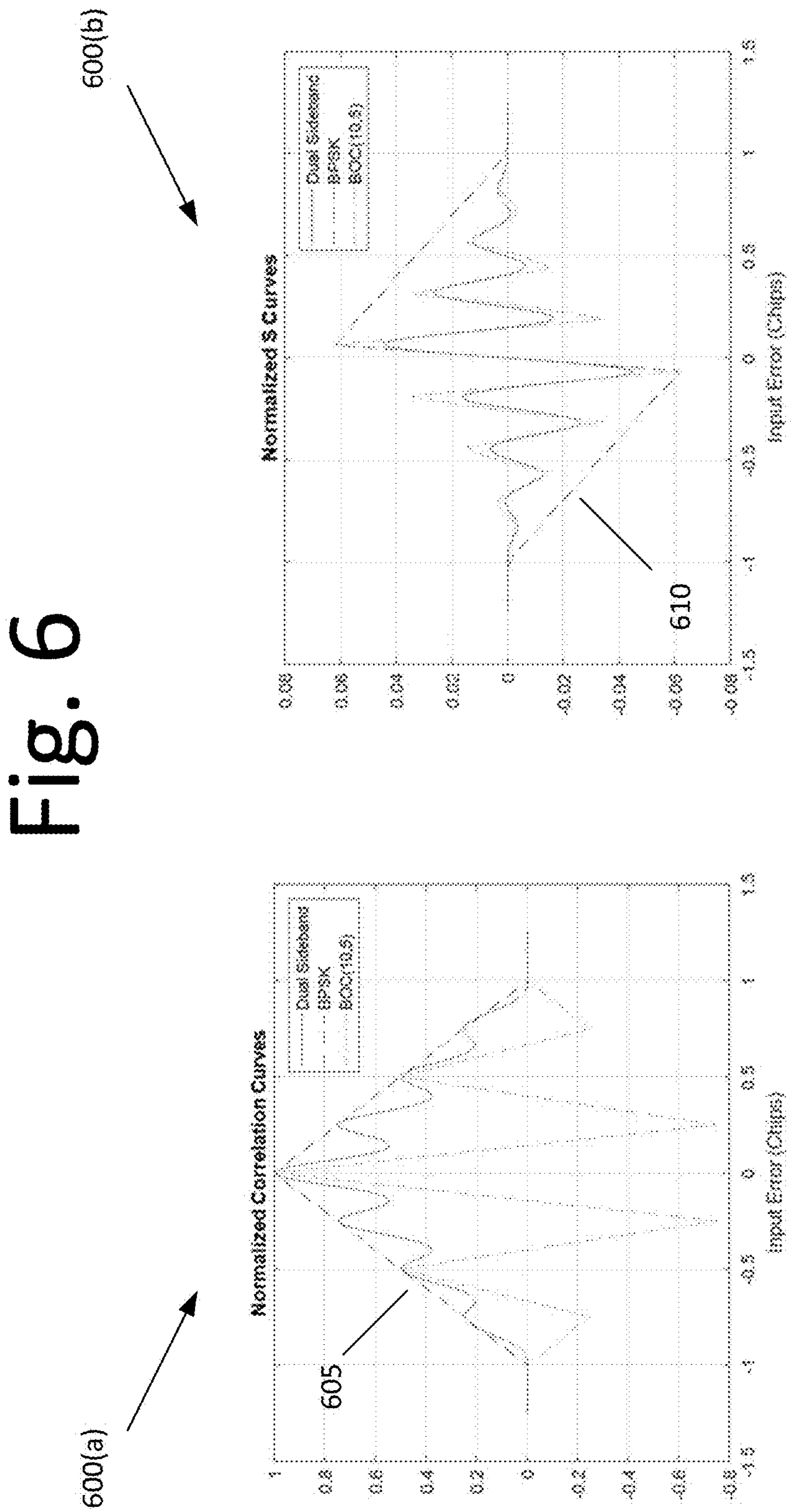
FIG. 6 illustrates graphs showing code correlation and discriminator curves respectively, according to an embodiment of the present invention.

FIG. 6 illustrates graphs 600(*a*) and 600(*b*) showing code correlation and discriminator curves respectively, according to an embodiment of the present invention. The solid curves are obtained from the signal generated using the sideband processing described in FIGS. 3 and 4, the dashed curves are from the pseudo-random code with BOC signal stripped off, and the dash-doted curves are obtained directly from the BOC(10,5) signal. The discriminator curves (also known as the S curves) shown in 600(*b*) are derived from the correlation curves in 600(*a*) using the commonly known Noncoherent-Early-Minus-Late-Power discriminator algorithm ($|E|^2-|L|^2$), which is also shown in FIG. 3.

Figure 7:
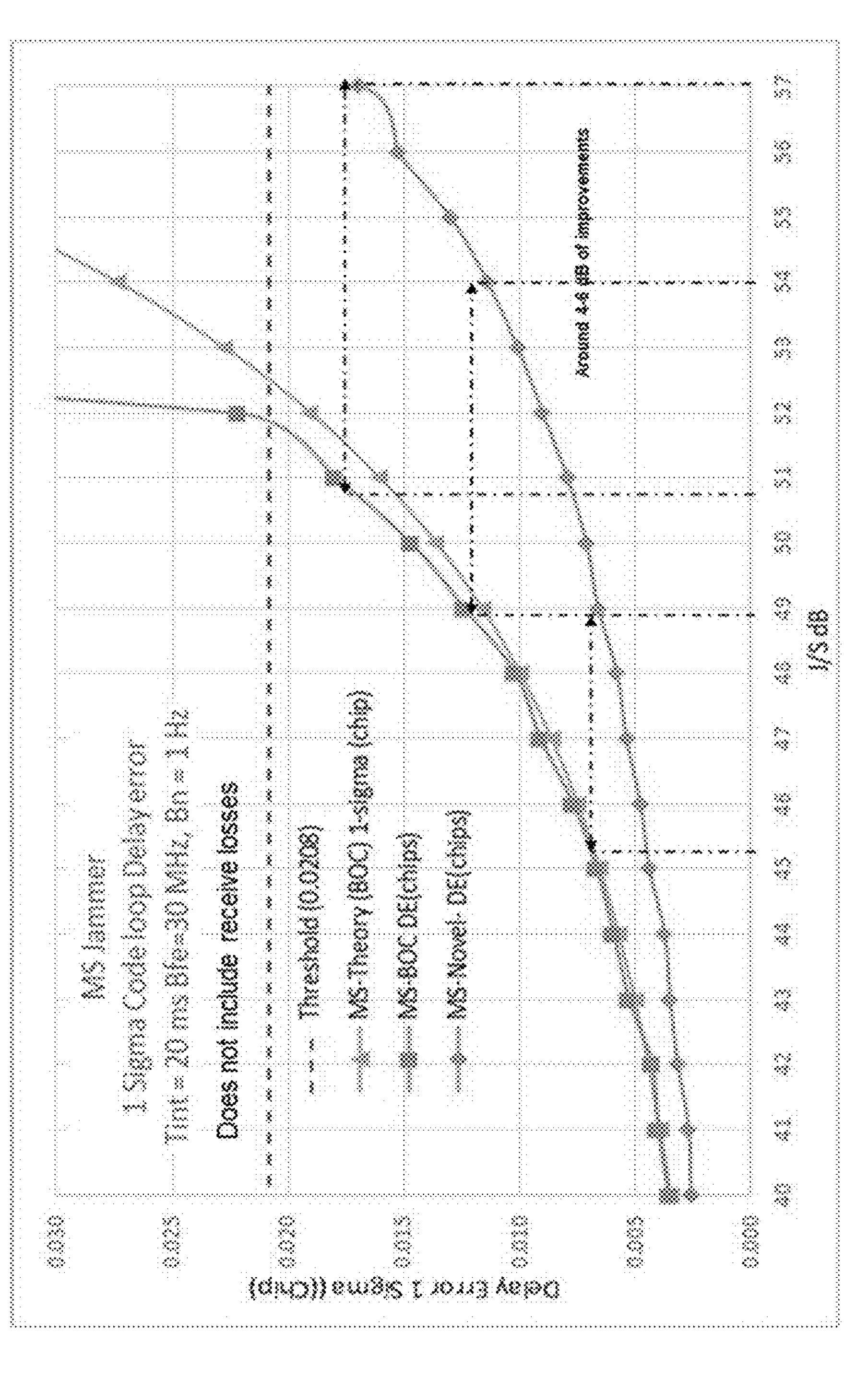
FIG. 7 illustrates a graph showing a M-code-1-sigma delay error under Matched Spectrum Jamming, according to an embodiment of the present invention.

FIG. 7 illustrates a graph 700 showing a M-code-1-sigma delay error under Matched Spectrum Jamming, according to an embodiment of the present invention. In this embodiment, graph 700 shows the performance gain of 4-6 dB, as labeled in the drawing, when using the signal processing technique of FIGS. 3 and 4.

Figure 8:
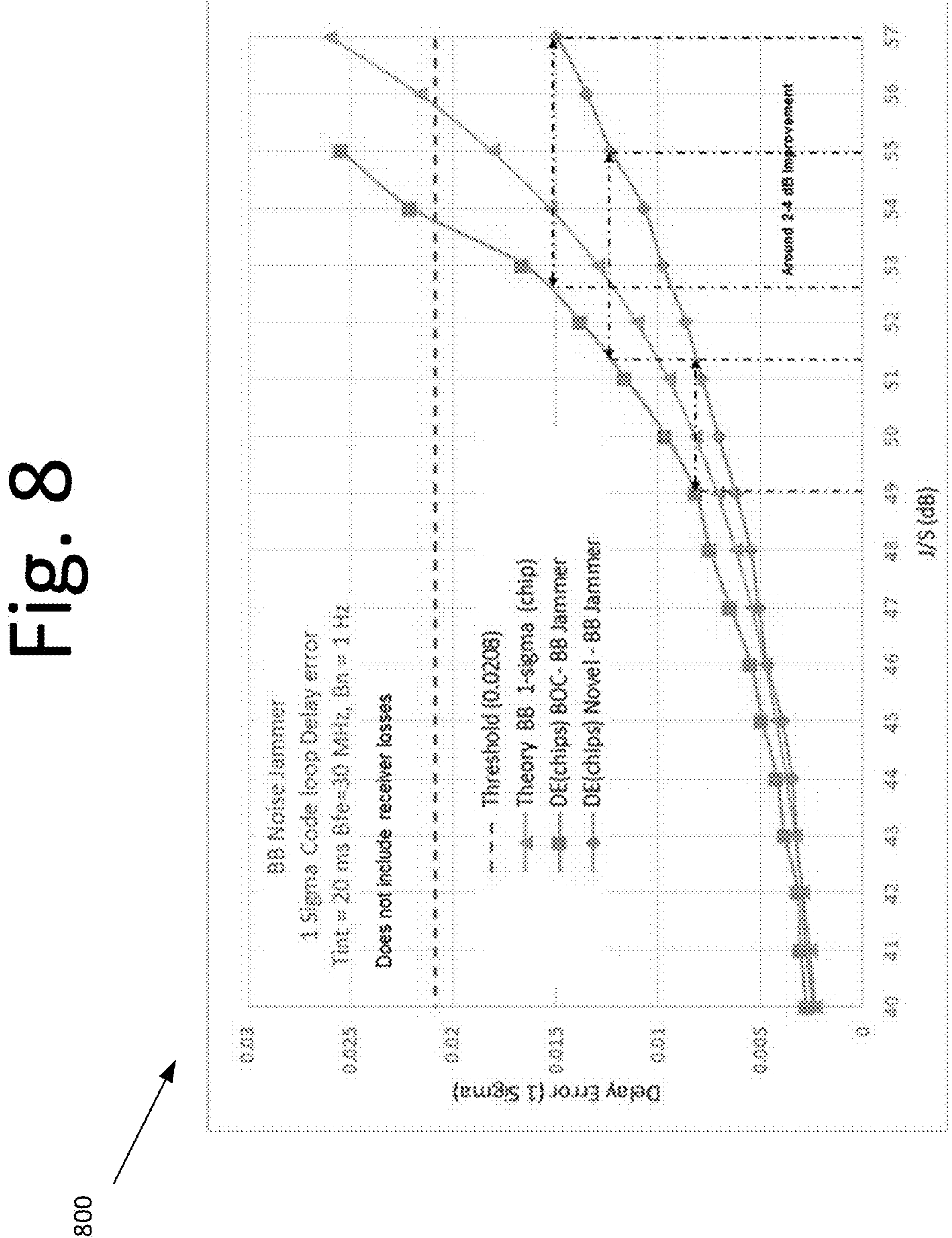
FIG. 8 illustrates a graph showing a M-code-1-sigma delay error under Broad Band Jamming, according to an embodiment of the present invention.

FIG. 8 illustrates a graph 700 showing a M-code-1-sigma delay error under Broad Band Jamming, according to an embodiment of the present invention. In this embodiment, graph 700 shows the performance gain of 3-4 dB, as labeled in the drawing, when using the signal processing technique of FIGS. 3 and 4.

FIG. 9 is a flow diagram illustrating a method for performing BOC sideband processing, according to an embodiment of the present invention. In some embodiments, method 900 may begin at 905 with the RF subsystem acquiring a BOC signal from a GPS satellite and converting the BOC signal to a based-banded signal. At 910, the digital subsystem and software module up converts a lower-sideband of the base-banded signal and down converts an upper-sideband of the base-banded signal. At 915, the digital subsystem and software module combines the up converted lower-sideband of the base-banded signal and the down converted upper-sideband of the base-banded signal to generate a signal.

The process steps performed in FIGS. 4 and 9 may be performed by a computer program, encoding instructions for the processor(s) to perform at least part of the process(es) described in FIGS. 4 and 9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system to implement all or part of the process steps described in FIGS. 4 and 9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general-purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A global positioning system (GPS) receiver configured to perform binary offset carrier (BOC) sideband processing, comprising:

an analog radio frequency (RF) subsystem configured to acquire a BOC signal from a GPS satellite and converts the BOC signal to a based-banded signal; and a digital subsystem and software module configured to up converts a lower-sideband of the base-banded signal and down converts an upper-sideband of the base-banded signal, and combine the up converted lower-sideband of the base-banded signal and the down converted upper-sideband of the base-banded signal to generate a BOC sideband processed signal.

2. The GPS receiver of claim 1, wherein the digital subsystem and software module is further configured to generate a local replica signal of the signal based on a local reference of the signal.

3. The GPS receiver of claim 2, wherein the digital subsystem and software module is further configured to up-convert a lower-sideband of a local BOC replica of the BOC signal and down convert an upper-sideband of the local BOC replica, wherein the local BOC replica is generated by the digital subsystem and software module, and combine the up-converted lower-sideband of the local BOC replica and down converted upper-sideband of the local BOC replica to generate the local replica of the signal.

4. The GPS receiver of claim 1, wherein the digital subsystem and software module comprises a BOC sideband processor configured to perform side-band processing of the acquired BOC signal.

5. The GPS receiver of claim 4, wherein the BOC sideband processor comprises a down-converter configured to down-convert the upper sideband of the BOC signal; and an up-converter configured to up-convert the lower sideband of the BOC signal.

6. The GPS receiver of claim 5, wherein the BOC sideband processor comprises a complex adder configured to combine the down converted upper sideband and the up converted lower sideband by leveraging BOC signal attributes, a sampling frequency, and circular shift property of a frequency conversion to create the BOC sideband processed signal.

7. The GPS receiver of claim 6, wherein the combined signal comprises a main lobe and a first sidelobe and a second sidelobe, the main lobe being combined upper side lobe and lower side lobe of the down-converted BOC signal and up-converted BOC signal, respectively, the first sidelobe and the second sidelobe being the lower sideband and the upper sideband of the down-converted BOC signal and up-converted BOC signal, respectively.

8. The GPS receiver of claim 7, wherein the BOC sideband processor is further configured to use a circular shift property by selecting a sampling frequency as function BOC signal specification.

9. The GPS receiver of claim 7, wherein the BOC sideband processor is further configured to use a local reference subcarrier frequency generated by a timing subsystem for performing the down conversion of the upper sideband of the BOC signal and the up conversion of the lower sideband of the BOC signal.

10. The GPS receiver of claim 9, wherein the BOC sideband processor is further configured to use a subcarrier tracking loop to adjust a local reference for ionospheric corrections, doppler and dynamics, wherein the local reference for the up conversion of the lower sideband and the local reference for the down conversion of the upper sideband to baseband is given by:

$$e^{+j2\pi F_{sc}t-\frac{\pi}{2}+e(t)}$$

$$e^{-j2\pi F_{sc}t+\frac{\pi}{2}+e(t)}$$

where $F_{sc}$ is the subcarrier frequency and e(t) is the residual error that is tracked out by the subcarrier tracking loop.

11. A global positioning system (GPS) receiver configured to perform binary offset carrier (BOC) sideband processing, comprising:

an analog radio frequency (RF) subsystem configured to acquire a BOC signal from a GPS satellite; and a digital Application Specific Integrated Circuit (ASIC) encompassing one or more signal processing applications configured to generate local replicas encompassing local BOC signal and a local sideband processed BOC signal, and perform sideband processing on the acquired BOC signal to generate a BOC sideband processed signal for the tracking loop.

12. The GPS receiver of claim 11, wherein the digital ASIC is further configured to up convert a lower-sideband of the base-banded signal and down converts an upper-sideband of the base-banded signal, and combine the up converted lower-sideband of the base-banded signal and the down converted upper-sideband of the base-banded signal to generate the other signal.

13. The GPS receiver of claim 11, wherein the digital ASIC is further configured to generate the local replica signal of the other signal based on a local reference of the signal.

14. The GPS receiver of claim 13, wherein the digital ASIC is further configured to up-convert a lower-sideband of a local BOC replica of the other signal and down convert an upper-sideband of the local BOC replica of the other signal, and combine the up-converted lower-sideband of the local BOC replica and down converted upper-sideband of the local BOC replica to generate the local replica of the other signal.

15. The GPS receiver of claim 14, wherein the digital ASIC comprises a BOC sideband processor configured to perform side-band processing of the acquired BOC signal.

16. The GPS receiver of claim 15, wherein the BOC sideband processor comprises a down-converter configured to down-convert the upper sideband of the BOC signal; and an up-converter configured to up-convert the lower side-band of the BOC signal.

17. The GPS receiver of claim 16, wherein the BOC sideband processor further comprises a complex adder configured to combine the down converted upper sideband and the up converted lower sideband by leveraging BOC signal attributes, a sampling frequency, and circular shift property of a frequency conversion to create a combined signal.

18. The GPS receiver of claim 17, wherein the combined signal comprises a main lobe being combined upper side lobe and lower side lobe of the down-converted BOC signal and up-converted BOC signal, respectively, a first sidelobe and a second sidelobe being the lower sideband and the upper sideband of the down-converted BOC signal and up-converted BOC signal, respectively.

19. The GPS receiver of claim 17, wherein the BOC sideband processor is further configured to use a circular shift property by selecting a sampling frequency as function BOC signal specification.

20. The GPS receiver of claim 17, wherein the BOC sideband processor is further configured to use a local reference subcarrier frequency generated by a timing subsystem for performing the down conversion of the upper sideband of the BOC signal and the up conversion of the lower sideband of the BOC signal.

21. The GPS receiver of claim 20, wherein the BOC sideband processor is further configured to use a subcarrier tracking loop to adjust a local reference for ionospheric corrections, doppler and dynamics, wherein the local reference for the up conversion of the lower sideband and the local reference for the down conversion of the upper sideband to baseband is given by:

$$e^{+j2\pi F_{sc}t-\frac{\pi}{2}+e(t)}$$

$$e^{-j2\pi F_{sc}t+\frac{\pi}{2}+e(t)}$$

where $F_{sc}$ is the subcarrier frequency and e(t) is the residual error that is tracked out by the subcarrier tracking loop.

22. A method for performing binary offset carrier (BOC) sideband processing, comprising:

acquiring, by an analog radio frequency (RF) subsystem, a BOC signal from a global positioning system (GPS) satellite and converting the BOC signal to a based-banded signal; and up converting, by a digital subsystem and software module, a lower-sideband of the base-banded signal and down converting an upper-sideband of the base-banded signal; and combining, by the digital subsystem and software module, the up converted lower-sideband of the base-banded signal and the down converted upper-sideband of the base-banded signal to generate a signal.

23. The method of claim 22, further comprising:

generating, by the digital subsystem and software module, a local replica signal of the signal based on a local reference of the signal.

24. The method of claim 23, further comprising:

up-converting, by the digital subsystem and software module, a lower-sideband of a local BOC replica of the BOC signal;

down converting, by the digital subsystem and software module, an upper sideband of the local BOC replica; and combining, by the digital subsystem and software module, the up-converted lower-sideband of the local BOC replica and down converted upper-sideband of the local BOC replica to generate the local replica of the signal.

25. The method of claim 22, further comprising:

performing, by a BOC sideband processor, side-band processing of the acquired BOC signal.

26. The method of claim 25, further comprising:

down-converting, by the BOC sideband processor, the upper sideband of the BOC signal; and up-converting, by BOC sideband processor, the lower sideband of the BOC signal.

27. The method of claim 26, further comprising:

combining, by the BOC sideband processor, the down converted upper sideband and the up converted lower sideband by leveraging BOC signal attributes, a sampling frequency, and circular shift property of a frequency conversion to create a combined signal.

28. The method of claim 27, wherein the combined signal comprises a main lobe and a first sidelobe and a second sidelobe, the main lobe being combined upper side lobe and lower side lobe of the down-converted BOC signal and up-converted BOC signal, respectively, the first sidelobe and the second sidelobe being the lower sideband and the upper sideband of the down-converted BOC signal and up-converted BOC signal, respectively.

29. The method of claim 28, further comprising:

using, by the BOC sideband processor, a circular shift property by selecting a sampling frequency as function BOC signal specification.

30. The method of claim 28, further comprising:

using, by the BOC sideband processor, a local reference subcarrier frequency generated by a timing subsystem for performing the down conversion of the upper sideband of the BOC signal and the up conversion of the lower sideband of the BOC signal.

31. The method of claim 30, further comprising:

using, by the BOC sideband processor, a subcarrier tracking loop to adjust a local reference for ionospheric corrections, doppler and dynamics, wherein the local reference for the up conversion of the lower sideband and the local reference for the down conversion of the upper sideband to baseband is given by:

$$e^{+j2\pi F_{sc}t-\frac{\pi}{2}+e(t)}$$

$$e^{-j2\pi F_{sc}t+\frac{\pi}{2}+e(t)}$$

where $F_{sc}$ is the subcarrier frequency and e(t) is the residual error that is tracked out by the subcarrier tracking loop.

* * * * *